Oct. 22, 1935.    A. R. STEIRLY    2,018,288
PUMP VALVE
Original Filed May 5, 1930
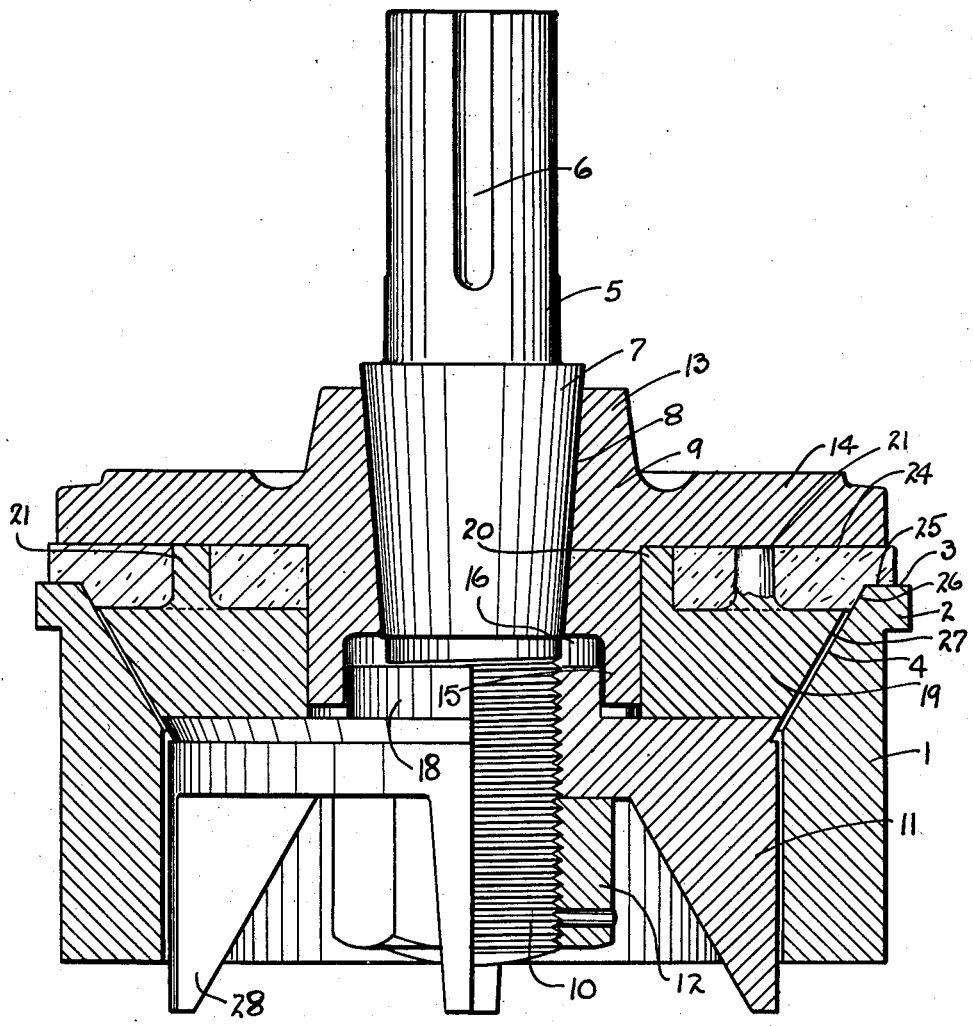
ALBERT R. STEIRLY    INVENTOR
BY  Jesse R. Stone
    &
    Lester B. Clark
                ATTORNEYS Patented Oct. 22, 1935

2,018,288

UNITED STATES PATENT OFFICE 2,018,288

PUMP VALVE

Albert R. Steirly, Houston, Tex.

Application May 5, 1930, Serial No. 449,869
Renewed March 19, 1935

4 Claims. (Cl. 251—127)

My invention relates to valves such as are employed in pumps ordinarily of the double-acting type employed in handling heavy and mud-laden liquids such as are employed in deep well drilling operations. It is to be understood that the valve may be employed in various types of pumps, however.

In pumps of the character in which my valve is adapted to operate provision must be made for heavy pump pressures and for wear due to the action of the mud which is handled by the pump and it is an object of my invention to provide a valve of the type stated in which the seal is made along a surface which may become materially worn before the seal is destroyed.

I desire to provide a pump having a compressible packing member thereon which is adapted to form a seal with the seat in which it fits before the metal holding the packing member is seated. The metal support, however, is adapted to contact with the seat to prevent excessive pressures from coming on the packing member.

I also have as an object to firmly mount the packing member in the body of the valve so that it is rigidly held in position but in such manner as to prevent excessive compression of the packing member during the operation of the valve.

It is also an object of the invention to provide a firm connection between the valve stem and the body of the valve through a tapered surface on the stem, thus preventing relative play between the stem and the valve body and thus eliminating wear in the operation of the valve.

In the drawing herewith I have shown a central vertical section through a valve embodying my invention, a part of the guide member of the valve being shown partly in section and partly in elevation.

To illustrate the construction of my valve I have shown a valve seat 1 of ordinary construction. This seat usually has a driven fit within a portion of the pump housing and serves to define an opening through which the fluid passes. The upper end of the seat has a slight outwardly extending radial flange 2 to engage with the pump housing. The upper end has a flat surface at 3, and a downwardly and inwardly inclined surface 4 upon which the valve member may contact.

The valve comprises a stem 5, the upper end of which is fluted at 6 in the usual manner and is adapted to work within a guide in the pump housing. Centrally of the stem is a downwardly tapering member 7 which is adapted to form a wedging fit within an opening 8 centrally of the upper valve plate 9. Below the said valve plate 9 the stem is threaded at 10 for engagement with the guide member 11 and the lock nut 12.

The upper valve plate 9 has a boss 13 at the upper side forming a rim about the tapered portion 7 of the valve stem into which said valve stem is fitted. A radial flange 14 of the plate forms the main supporting member and has a diameter somewhat less than the upper surface 3 of the valve seat. Below the flange 14 the body of the plate is extended downwardly at 15. Within the downward extension 15 the body of the plate is recessed at 16 to receive an upper flange 18 on the guide member.

The lower valve plate 19 is circular in shape and fits closely about the body of the upper valve plate and within the recess formed below the flange 14 of said upper plate. Said lower plate 19 has an upwardly extending flange 20 thereon, the upper end of which bears against the lower side of the plate 14. There are formed upon the lower plate a plurality of upwardly extending studs 21, which are preferably integral with the lower plate and spaced apart about the upper surface of the said plate 19.

The recess provided in the lower plate outside the upwardly extending flange 20 forms a space within which the packing gasket 24 may fit. Said gasket 24 is preferably of a tough form of rubber although any similar compressible material may be used. It is annular in shape and has openings therein at spaced intervals to receive the studs 21 upon the plate 19. The outer edge of the gasket extends beyond the upper plate 14 and rests upon the surface 3 of the seat member. It is provided on its lower side with a notch or recess to conform to the shape of the upper portion of the seat. There is a flat surface 25 engaging the surface of said seat and a downwardly inclined surface 26 to engage the surface 4 of the seat. The surface 26 as well as the flat surface 25 above referred to is of slightly larger external diameter than is the downwardly tapered area 27 upon the plate 19 so that it will be seen that the gasket will contact with the seat before the plate 19 rests thereon. It is also to be noted that the outer area 25 on the packing ring engages the upper end of the seat, forming a fluid seal at that place.

The guide member 11 is of ordinary construction. It is threaded to engage the stem at 10 and an upper flange 18 thereon fits within the recess 16 in the upper plate. The guide wings 28 have their outer surfaces spaced slightly from the inner wall of the seat 1. These wings act to guide the valve back to its seat after said valve has been raised.

In the use of my invention the pressure of the fluid above the valve will tend to close the same and a tight seal will be formed along the outer edge of the gasket along the surfaces 3 and 4 of the seat. If the pressure is heavy the gasket will be compressed until the plate 19 strikes the seat 4 and takes up the pressure, relieving the rubber gasket of the excessive weights thereon. It will be noted that the rubber gasket projects slightly beyond the plate 14 so that it will receive directly some of the fluid pressures received by the valve. Most of the pressure, however, will be taken up by the metal flange 14 of the upper plate and this will be supported upon the lower plate through the upper flange 20 and the studs 21.

It will be seen that my device is adapted to work under heavy pressures and the rubber packing member will be in position to make a tight seal at all times without being compressed beyond the extent necessary to form a seal; for any pressures above those necessary to form a tight seal with the valve seat will be taken up by the lower metal plate 19. This type of structure is adapted to wear for long periods of time before the seal will become impaired. The seat itself and the parts forming the valve member may be materially worn before leakage will occur about this valve. It is a simple and sturdy structure which will last for long periods of time without replacement.

What I claim as new is:

1. A valve for pumps including a valve seat ring having a downwardly tapered seat, upper and lower valve plates, means to space said plates apart to provide a packing recess, a packing gasket in said recess, the outer margin of said gasket having a surface perpendicular to the axis to engage the upper end of said ring and a tapered portion to engage said seat, said lower plate being adapted to fit said seat after said gasket engages the upper end of said ring.

2. A valve for pumps including a valve seat ring the upper end being formed on a plane perpendicular to the axis but beveled on its inner edge to provide a seat, upper and lower valve plates, a packing gasket between said plates, means to space said plates apart and to hold said gasket in position, said gasket being shaped to fit the upper end of said ring, said lower plate being downwardly tapered and of smaller diameter than said gasket whereby it engages said seat only after said gasket is slightly compressed.

3. A valve for pumps including a valve ring having a flat upper end and a downwardly tapered seat thereon, upper and lower valve plates, a gasket between said plates, said gasket extending slightly outside the margin of said upper plate, the lower margin of said gasket having a flat surface to fit the upper end of said ring and a tapered surface to fit said seat.

4. A valve for pumps including a valve seat ring, a downwardly tapered seat thereon, upper and lower valve plates, a gasket between said plates, said gasket extending slightly outside the margin of said upper plate, the lower margin of said gasket having a flat surface to fit the upper end of said ring and a tapered surface to fit said seat, said lower plate being shaped to fit said seat after said gasket is slightly compressed upon said seat.

ALBERT R. STEIRLY.